United States Patent
Snodgrass et al.

[15] 3,665,058

[45] May 23, 1972

[54] MODIFIED POLYPHENYLENE OXIDE RESIN COMPOSITIONS

[72] Inventors: Hugh E. Snodgrass, Mishawaka; Robert L. Lauchlan, Granger, both of Ind.

[73] Assignee: Uniroyal, Inc., New York, N.Y.

[22] Filed: Apr. 20, 1970

[21] Appl. No.: 30,280

[52] U.S. Cl. ...................260/889, 260/874, 260/876 R, 260/897 B
[51] Int. Cl. .......................................................C08f 29/12
[58] Field of Search ..............................260/897, 874, 889

[56] References Cited

UNITED STATES PATENTS

| | | |
|---|---|---|
| 3,361,851 | 1/1968 | Gowan.................................260/897 |
| 3,297,784 | 1/1967 | Snedeker et al.......................260/837 |
| 3,383,435 | 5/1968 | Cizek...................................260/874 |

*Primary Examiner*—Samuel H. Blech
*Assistant Examiner*—C. J. Seccurd
*Attorney*—Thomas A. Beck

[57] ABSTRACT

Blends of polyphenylene oxide resin with poly(ethylene-co-organic-acid-ester) resins provide thermoplastic compositions characterized by unique properties, particularly an unusually useful combination of high impact strength, high thermal stability, high tensile strength, and high elastic moduli. Such compositions are optionally modified through the inclusion of an alkenyl aromatic resin (e.g., polystyrene, etc.), to exhibit much improved melt processing characteristics in addition to high strength properties.

52 Claims, No Drawings

MODIFIED POLYPHENYLENE OXIDE RESIN COMPOSITIONS

INTRODUCTION

The present invention relates to polyphenylene oxide resin compositions characterized by much improved impact strength. More particularly, the invention relates to the thermoplastic resin blend of a polyphenylene oxide resin with a poly(ethylene-co-organic-acid-ester) resin. Such mixtures may optionally be modified through the inclusion of an alkenyl aromatic polymer such as polystyrene.

BACKGROUND OF THE INVENTION

The polyphenylene oxide resins are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff. The high molecular weight polymers are high performance engineering thermoplastics possessing relatively high softening points, i.e., in excess of 175° F. and excellent dimensional stability.

The modification of polyphenylene oxide resins through the inclusion of an alkenyl aromatic polymer, e.g., polystyrene, etc., an option in the present invention, is known and described in U.S. Pat. No. 3,356,761 of Daniel W. Fox and U.S. Pat. No. 3,383,435 of Eric P. Cizek. Such modified polyphenylene oxide resins are characterized by improved melt processability and reduced melt temperatures.

However, neither the polyphenylene oxide resin nor the modified polyphenylene oxide resin compositions have sufficient impact strength to permit use of these materials in applications where they might otherwise be advantageously employed.

STATEMENT OF THE INVENTION

The present invention relates to polyblends containing:

A. between about 75 and 99 percent (all percentages are expressed by weight herein) of a thermoplastic resin matrix, said resin matrix consisting of polyphenylene oxide resin by itself or in combination with alkenyl aromatic resins; and B. correspondingly between about 1 and 25 percent of poly(ethylene-co-organic-acid-ester)resin.

The resulting thermoplastic blends exhibit unexpected properties including high impact strength over a wide temperature range, good melt processability, high heat distortion temperatures and high flexural moduli.

DESCRIPTION OF THE INVENTION

The polyphenylene oxide resins with which this invention is concerned are those having the repeating structural unit of the formula:

(I)

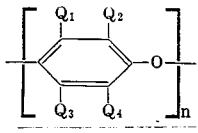

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, hydrocarbonoxy radicals free of tertiary alpha-carbon atoms, and halohydrocarbonoxy radicals having at least two carbon atoms between the halogen atom and phenol nucleus and being free of tertiary alpha-carbon atoms.

Typical examples of such polymers and methods of making same are found in U.S. Pat. Nos. 3,306,874; 3,306,875; 3,257,357; 3,361,851; and *New Linear Polymers*, by Lee et al., N. Y., McGraw-Hill, 1967, pages 61–82, the contents of which patents and text are incorporated herein by reference.

The preferred polyphenylene oxide resins are those having alkyl substitution ortho to the oxygen ether atom and most preferably, ortho methyl substitution. Such polymers are readily available on a commercial basis and combine with the poly(ethylene-co-organic-acid-ester) resins to form homogeneous mixtures having an excellent combination of useful physical properties.

The alkenyl aromatic polymers with which this invention is concerned, as an optional means of modifying the polyphenylene oxide resin, are those having at least 25 percent, by weight, polymer units derived from compounds having the formula:

(II)

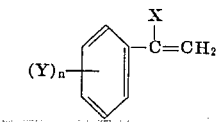

wherein X represents hydrogen or a lower alkyl radical such as a methyl or ethyl radical; Y represents a member of the group consisting of hydrogen, halogens having atomic numbers of from 17 to 35 inclusive, and lower alkyl radicals containing from one to four carbon atoms such as the methyl, ethyl, propyl, isopropyl, butyl, sec-butyl and tert-butyl radicals; and $n$ represents an integer from 1 to 5.

Such alkenyl aromatic monomers, as defined in the above formula II, may be copolymerized with various other monomers in order to obtain modified alkenyl aromatic polymers useful in the present invention. Suitable comonomers may be represented by the general formula:

(III)

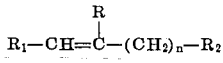

wherein R and $R_1$ each represent a substituent selected from the group consisting of hydrogen, halogen, an alkyl group having one to four carbon atoms, carboalkoxy, or R and $R_1$ compositely represent an anhydride linkage (—COOOC—), and $R_2$ is hydrogen, vinyl, an alkyl or alkenyl group having one to 12 carbon atoms, cycloalkyl, carboalkoxy, alkoxy alkyl, alkyl carboxy, ketoxy, halogen, carboxy, cyano, or pyridyl group and $n$ is an integer between 0 and 9.

The term "alkenyl aromatic polymer" as used throughout this disclosure and in the claims, and defined by the preceding formulas II and III includes, by way of example, homopolymers such as polystyrene, poly-α-methylstyrene, and the polychlorostyrenes; the styrene-containing interpolymers such as the styrene-acrylonitrile copolymers (SAN), styrene-butadiene copolymers, α-alkylstyrene-acrylonitrile copolymers, styrene-acrylonitrile-butadiene terpolymers (ABS), copolymers of ethyl-vinyl benzene, divinyl benzene, and the like; and the various rubber modified polystyrenes generally referred to as high impact polystyrenes.

The poly(alkenyl aromatic) resins described above may be prepared using polymerization methods as described by Billmeyer in *Textbook of Polymer Science*, N. Y., Interscience Publishers, 1966. The preferred alkenyl aromatic polymers are: polystyrene, poly-α-methyl styrene, the SAN copolymers, the ABS copolymers, and the high impact polystyrenes; as these resins form fully compatible, homogeneous mixtures with the preferred types of polyphenylene oxide resins previously noted.

The poly(ethylene-co-organic-acid-ester) resins with which this invention is concerned are derived from the polymerization of ethylene in the presence of a copolymerizable, vinyl containing, organic acid ester. Such copolymers may be represented by the formulas:

(IV) 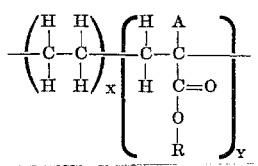

(V) 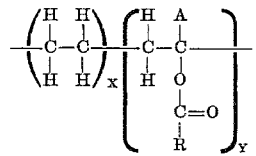

wherein X represents the number of ethylene units present in the copolymer; Y represents the number of organic-acid-ester units present in the copolymer; A is chosen from the class consisting of hydrogen, methyl, ethyl, and halogen preferably chlorine; and R is an alkyl, cycloalkyl, aralkyl, or aryl radical all of which do not contain more than 12 carbon atoms, although in the case of an alkyl group only 1 carbon atom need be present. Formula IV illustrates copolymers of ethylene with organic-acid-esters wherein the copolymerizable vinyl unsaturation is contained in the acid portion of the organic-acid-ester, and includes, by way of example, copolymers such as ethylene-ethyl acrylate. Formula V illustrates copolymers of ethylene with organic-acid-esters wherein the copolymerizable vinyl unsaturation is contained in the alcohol portion of the organic-acid-ester, and includes, by way of example, copolymers such as ethylene-vinyl acetate.

In the compositions of the present invention, the ethylene-organic-acid-ester copolymer comprises from 1 to 25 percent of the blend, and more preferably between 5 and 15 percent of the blend. The preferred weight ratio of ethylene to organic-acid-ester (X to Y in formulas IV and V) in the copolymers useful in this invention may range from 95/5 to 60/40. Although other copolymers may be used in the present invention, it has been found that those copolymers which satisfy the above specification are most satisfactory in terms of obtaining homogeneous compositions characterized by the unique combination of physical properties with which this invention is concerned.

Correspondingly, the polyphenylene oxide resin constitutes at least 75 percent of the blend and more preferably between 80 and 95 percent of the blend. Alternatively when the polyphenylene oxide resin is modified through the inclusion of a poly(alkenyl aromatic) resin, the polyphenylene oxide resin content of this matrix is greater than 50 percent, preferably greater than 66 percent and the alkenyl aromatic resin content is less than 50 percent, preferably less than 34 percent, but the total of both types of polymers must be at least 75 percent of the total weight of the resin copolymer blend. In modifying the polyphenylene oxide resin through the inclusion of an alkenyl aromatic polymer, the latter material may either be physically admixed with the polyphenylene oxide resin, or polymerized in situ, both of which methods are disclosed in the prior art in U.S. Pat. Nos. 3,383,435 and 3,356,761 respectively.

The method of blending the polyphenylene oxide, or alternatively, the polyphenylene oxide resin modified through the inclusion of an alkenyl aromatic resin with the poly(ethylene-co-organic-acid-ester) resin is not critical, and does not constitute a part of this invention. Preferably the resin matrix and copolymer are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at sufficiently high temperatures to soften the polymers so that they are thoroughly dispersed and intermingled with each other.

Alternatively the matrix resin and rubber may be solution blended by dissolving the polymers in a solvent such as toluene or xylene and subsequently precipitating the polymer blend by adding the solution to a non-solvent such as isopropanol, producing a homogeneous blend which is then dried by an suitable method.

The mixtures of the invention may contain certain other additives to plasticize, lubricate, dye, pigment, prevent oxidation of, retard flammability of, etc., the resin-copolymer blends. Such additives are well known in the art and may be incorporated without departing from the scope of the invention.

The advantage which results from this invention is that it provides a new class of polyphenylene oxide resin mixtures characterized by a unique combination of physical properties. In particular, one may advantageously utilize the high heat distortion properties of the polyphenylene oxide resin, and through the incorporation of a poly(ethylene-co-organic-acid-ester) resin obtain compositions having very high impact strength, without detrimentally affecting the other strength properties of the resin.

The optional incorporation of an alkenyl aromatic polymer as a means of further modifying the polyphenylene oxide resin provides compositions that may be melt processed at relatively lower temperatures than the polyphenylene oxide resin. The addition of poly(ethylene-co-organic-acid-ester) resins to mixtures of this nature provides compositions having high impact strength.

Further benefits obtained by blending a poly(ethylene-co-organic-acid-ester)resin with a polyphenylene oxide resin are illustrated in the following examples which are set forth as a further description of the invention, but are not to be construed as limiting the invention thereto.

The test data included in the following examples was determined according to ASTM procedures:

D256A–B56: Notched Izod Impact Strength
D648–56: Heat Distortion Temperatures(at 264 psi)
D790–66: Elastic Modulus in Flexure
D638–64T: Tensile Strength In the following Examples 1 to 3 several different ethylene-vinyl acetate copolymers were blended with a polyphenylene oxide resin at the 5, 10, and 15 percent (by weight) level. The polyphenylene oxide resin (also referred to as PPO) was produced by the General Electric Company and coded PPO type 531–801. This particular material was a poly(2,6-dimethyl-1,4-phenylene oxide) resin having a molecular weight of about 30,000, a specific gravity of 1.06 and characterized by an intrinsic viscosity of 0.58 measured in toluene at 30° C.

EXAMPLE 1

The blending operations were accomplished via a Banbury internal shear mixer. The resin and copolymers were mixed in a molten state at or above a temperature of 450° F. and at a mean shear rate of approximately 300 sec$^{-1}$. A mixing time of 7 minutes was sufficient to obtain a homogeneous blend of the polyphenylene oxide resin and ethylene-vinyl acetate copolymer. The blends were then calendered into sheet material and subsequently compression molded into plaques one-fourth inch in thickness, at 350 psi and 500° F., from which test specimens were machine cut.

A copolymer consisting of approximately 91.5 percent ethylene and 8.5 percent vinyl acetate was blended with the polyphenylene oxide resin (type 531–801) at the 5, 10, and 15 percent by weight levels. The copolymer was characterized by a melt index of 7.0 grams/10 minutes (ASTM D1238) and a specific gravity of 0.930.

EXAMPLE 2

A copolymer consisting of approximately 88 percent ethylene and 12 percent vinyl acetate was blended with the polyphenylene oxide resin (type 531–801) at the 5, 10, and 15 percent by weight levels. The copolymer was characterized by a melt index of 2.5 grams/10 minutes (ASTM D1238) and a specific gravity of 0.935.

EXAMPLE 3

A copolymer consisting of approximately 75 percent ethylene and 25 percent vinyl acetate was blended with the polyphenylene oxide resin (type 531–801) at the 5, 10, and 15 percent by weight levels. The copolymer was characterized by a melt index of 2.0 grams/10 minutes (ASTM D1238) and a specific gravity of 0.95.

The physical test data for Examples 1–3 is summarized in Table I, following:

TABLE I.—EXAMPLES 1–3

[Comparison of resin and polyblend properties]

| | Percent copolymer (by wt.) | Notched Izod impact strength (ft. lbs./in. notch at 73° F.) | Heat distortion temperature (° F. at 264 p.s.i.) | Flexural modulus (p.s.i.× 10⁻³) | Tensile strength (p.s.i.× 10⁻³) |
|---|---|---|---|---|---|
| Control data (PPO 531–801 resin) | | 1.5 | 374 | 342 | 10.4 |
| Example 1 | 5 | 4.0 | 374 | 336 | 9.7 |
| | 10 | 5.4 | 370 | 273 | 7.9 |
| | 15 | 1.6 | 362 | 233 | 5.2 |
| Example 2 | 5 | 4.0 | 371 | 332 | 9.6 |
| | 10 | 5.2 | 366 | 275 | 7.8 |
| | 15 | 1.6 | 362 | 234 | 4.6 |
| Example 3 | 5 | 4.2 | 370 | 335 | 9.8 |
| | 10 | 5.0 | 369 | 321 | 9.3 |
| | 15 | 1.8 | 366 | 261 | 6.9 |

As shown in Table I the addition of an ethylene-vinyl acetate copolymer to the polyphenylene oxide resin yields compositions having greatly improved impact strengths. Generally, the degree of improvement in impact strength is in the range of 250 to 350 percent for blends containing 5 to 10 percent of the copolymer. The reduction in heat distortion temperature, flexural modulus, and tensile strength for these blends as compared to the unmodified polyphenylene oxide resin is negligible. As the level of copolymer is increased to 15 percent by weight, the compositions become much more flexible, as indicated by the reduction in flexural modulus.

EXAMPLE 4

As in Example 1, a different ethylene-vinyl acetate copolymer was blended with polyphenylene oxide resin (type 531–801) at the 5 and 10 percent by weight levels. The copolymer consisted of approximately 72 percent ethylene and 28 percent vinyl acetate and was characterized by a melt index of 15.0 grams/10 minutes (ASTM D1238) and a specific gravity of 0.95. Impact strengths of 2.3 and 4.5 ft.lbs./in., respectively, were obtained for the polyblends. Again, the incorporation of the copolymer did not significantly affect the heat distortion temperature, or flexural modulus of the polyphenylene oxide resin.

EXAMPLE 5

An ethylene-ethyl acrylate copolymer was blended with polyphenylene oxide resin (type 531–801) at the 5, 10, 15, and 20 percent by weight levels, following the procedure described in Example 1. The copolymer consisted of approximately 80 percent ethylene and 20 percent ethyl acrylate and was characterized by a melt flow index of 2.5 grams/10 minutes (ASTM D1238) and a specific gravity of 0.928. Physical test data of the polyblends is shown in Table II.

TABLE II.—EXAMPLE 5

[Comparison of resin and polyblend properties]

| Percent copolymer (by wt.) | Notched Izod impact strength (ft. lbs./in. notch at 73° F.) | Heat distortion temperature (° F. at 264 p.s.i.) | Flexural modulus (p.s.i.× 10⁻³) | Tensile strength (p.s.i.× 10⁻³) |
|---|---|---|---|---|
| Control data (PPO 531–801 resin) | 1.5 | 374 | 342 | 10.4 |
| 5 | 5.1 | 370 | 295 | 8.6 |
| 10 | 3.8 | 367 | 274 | 7.6 |
| 15 | 4.2 | 366 | 231 | 6.6 |
| 20 | 2.3 | 365 | 203 | 5.7 |

As shown in Table II the addition of an ethylene-ethyl acrylate copolymer to the polyphenylene oxide resin yields compositions having greatly improved impact strengths. Generally, the degree of improvement in impact strength is in the range of 250 to 350 percent for blends containing 5 to 15 percent of the copolymer. The reduction in heat distortion temperature, flexural modulus, and tensile strength for these blends as compared to the unmodified polyphenylene oxide resin is negligible. As the level of copolymer is increased to 20 percent by weight, the compositions become much more flexible, as indicated by the reduction in flexural modulus.

EXAMPLE 6

A different ethylene-ethyl acrylate copolymer was blended with polyphenylene oxide resin (type 531–801) at the 10 percent by weight level using the procedure described in Example 1. The copolymer consisted of approximately 80 percent ethylene and 20 percent ethyl acrylate and was characterized by a melt index (ASTM D1238) of 18.5 grams/10 minutes and a specific gravity of 0.028. The impact strength of the polyblend, 2.7 ft.lbs./in. notch, was more than twice that of the unmodified polyphenylene oxide resin.

In the following Examples 7–12 several poly (ethylene-co-organic-acid-ester) resins were blended with a sytrene modified polyphenylene oxide resin at the 10 percent by weight level. The polyphenylene oxide resin was produced by the General Electric Company and coded PPO type 534–801. This particular material was modified poly(2,6-dimethyl-1,4-phenylene oxide) resin containing approximately 20 percent styrene, and was characterized by an intrinsic viscosity of 0.60 measured in toluene at 30° C.

EXAMPLE 7

The blending operations were accomplished via a Banbury internal shear mixer. The resin and copolymers were mixed in a molten state at or above a temperature of 400° F. and at a mean shear rate of approximately 300 sec⁻¹. A mixing time of 7 minutes was sufficient to obtain a homogeneous blend of the polyphenylene oxide resin and ethylene-organic-acid-ester copolymer. The blends were then calendered into sheet material and subsequently compression molded into plaques one-fourth inch in thickness, at 350 psi and 450° F., from which test specimens were machine cut.

The ethylene-vinyl acetate copolymer of Example 1, 91.5 percent ethylene and 8.5 vinyl acetate, was blended with the polyphenylene oxide resin (type 534–801) at the 10 percent by weight level.

EXAMPLE 8

The ethylene-vinyl acetate copolymer of Example 2, 88 percent ethylene and 12 percent vinyl acetate, was blended with the polyphenylene oxide resin (type 534–801) at the 10 percent by weight level.

EXAMPLE 9

The ethylene-vinyl acetate copolymer of Example 3, 75 percent ethylene and 25 percent vinyl acetate, was blended with the polyphenylene oxide resin (type 534–801) at the 10 percent by weight level.

EXAMPLE 10

The ethylene-vinyl acetate copolymer of Example 4, 72 percent ethylene and 28 percent vinyl acetate, was blended with the polyphenylene oxide resin (type 534–811) at the 10 percent weight level.

EXAMPLE 11

The ethylene-ethyl acrylate copolymer of Example 5, 80 percent ethylene and 20 percent ethyl acrylate, was blended with the polyphenylene oxide resin (type 534–801) at the 10 percent by weight level.

EXAMPLE 12

The ethylene-ethyl acrylate copolymer of Example 6, 80 percent ethylene and 20 percent ethyl acrylate, was blended with the polyphenylene oxide resin (type 534–801) at the 10 percent by weight level.

The physical test data for Examples 7–12 is summarized in Table III as follows:

TABLE III.—EXAMPLES 7–12

[Comparison of resin and polyblend properties]

|  | Notched Izod impact strength (ft. lbs./in. notch at 73° F.) | Heat distortion temperature (° F. at 264 p.s.i.) | Flexural modulus (p.s.i.× 10⁻³) | Tensile strength (p.s.i.×10⁻³) |
| --- | --- | --- | --- | --- |
| Control data (PPO 534–801 resin) | 1.9 | 328 | 366 | 10.5 |
| Example 7 | 2.5 | 324 | 294 | 8.3 |
| Example 8 | 2.8 | 322 | 301 | 8.4 |
| Example 9 | 3.7 | 322 | 290 | 7.9 |
| Example 10 | 2.7 | 324 | 299 | 8.2 |
| Example 11 | 2.7 | 323 | 297 | 8.2 |
| Example 12 | 2.4 | 324 | 299 | 8.1 |

As shown in Table III, Examples 7–12 the addition of a poly(ethylene-co-organic-acid-ester) resin to the styrene modified polyphenylene oxide resin yields compositions having significantly improved impact strengths. Generally, the degree of improvement in impact strength is in the range of 130 to 200 percent for blends containing 10 percent of the copolymer. The reduction in heat distortion temperature, flexural modulus, and tensile strength for these blends as compared to the polyphenylene oxide resin is negligible.

EXAMPLES 13–17

A polystyrene resin was blended with a polyphenylene oxide resin of the type in Example 1 (i.e., PPO type 531–801) at the 5, 15, 25, 35, and 45 percent by weight levels. The polystyrene was a general purpose grade available from the Shell Chemical Corporation and coded type 300. The polystyrene was characterized by specific gravity of 1.05 and a nominal melt flow index of 8.0 grams/10 minutes.

The polyphenylene oxide and polystyrene resins were mixed in the molten state in a Banbury internal shear mixer at a mean shear rate of 300 sec⁻¹. A 6-minute mixing time was found sufficient to obtain a homogeneous mixture of the two polymers. The mixing temperature ranged from 500° to 400° F. depending on the amount of polystyrene present in the composition, i.e., the mixing temperature for a particular blend decreases as the amount of polystyrene present in the blend increases. The blends were subsequently calendered into sheet material from which plaques were then compression molded at 350 psi. Test specimens were machine cut from these plaques. Physical test data is summarized in Table IV. Examples 13–17 are included to illustrate the modification of the polyphenylene oxide resin with an alkenyl aromatic polymer, an option in the present invention.

TABLE IV.—EXAMPLES 13–17

[Physical properties of polyphenylene oxide/polystyrene blends]

|  | Polystyrene (Percent by Wt.) | Notched Izod impact strength (ft. lbs./in. notch at 73° F.) | Heat distortion temperature (° F. at 264 p.s.i.) | Flexural modulus (p.s.i.× 10⁻³) | Tensile strength (p.s.i.× 10⁻³) |
| --- | --- | --- | --- | --- | --- |
| Control Data (PPO 531–801 resin) | | 1.6 | 369 | 336 | 9.0 |
| Example 13 | 5 | 1.4 | 359 | 348 | 10.8 |
| Example 14 | 15 | 1.2 | 335 | 376 | 11.2 |
| Example 15 | 25 | 1.2 | 313 | 387 | 11.5 |
| Example 16 | 35 | 1.1 | 293 | 407 | 11.7 |
| Example 17 | 45 | 0.7 | 278 | 421 | |

The following Examples 18–20 illustrate the addition of various poly(ethylene-co-organic-acid-ester) resins to blends of polyphenylene oxide and polystyrene described in the previous Examples 13–17.

EXAMPLE 18

The copolymers and resin matrix were mixed in a Banbury internal shear mixer at elevated temperatures such that the polymers were in a molten state. The blends were mixed at a mean shear rate of 300 sec.⁻¹, and at temperatures in the range of 475° to 400° F. The compounds were then calendered into sheet material from which plaques were compression molded at 350 psi and 450° F. Test specimens were machine cut from these plaques.

A copolymer of the type in Example 3 was incorporated into the blend of polyphenylene oxide and polystyrene of Example 14. The total content of the blend was thus 76.5 percent polyphenylene oxide, 13.5 percent polystyrene and 10 percent ethylene-vinyl acetate copolymer (75 percent ethylene and 25 percent vinyl acetate) corresponding to a ratio of 85:15:10 parts by weight of the respective components.

EXAMPLE 19

A copolymer of the type in Example 4 was incorporated into the blend of polyphenylene oxide and polystyrene of Example 14. The total content of the blend was thus 76.5 percent polyphenylene oxide, 13.5 percent polystyrene and 10 percent ethylene-vinyl acetate copolymer (72 percent ethylene and 28 percent vinyl acetate) corresponding to a ratio of 85:15:10 parts by weight of the respective components.

EXAMPLE 20

A copolymer of the type in Example 5 was incorporated into the blend of polyphenylene oxide and polystyrene of Example 14. The total content of the blend was thus 76.5 percent polyphenylene oxide, 13.5 percent polystyrene and 10 percent ethylene-ethyl acrylate copolymer (80 percent ethylene and 20 percent ethyl acrylate) corresponding to a ratio of 85:15:10 parts by weight of the respective components.

Physical test data is summarized in Table V as follows:

TABLE V.—EXAMPLES 18–20

[Physical properties of polyphenylene oxide/polystyrene/ethylene copolymer blends]

|  | PPO/PS/ copolymer ratio (parts by weight) | Notched izod impact strength (ft. lbs./in. notch by 73° F.) | Heat distortion temperature (° F. at 264 p.s.i.) | Flexural modulus (p.s.i. ×10⁻³) | Tensile strength (p.s.i. 10×⁻³) |
| --- | --- | --- | --- | --- | --- |
| Control data, Example 14 | 85:15:0 | 1.2 | 335 | 376 | 11.2 |
| Example 18 | 85:15:10 | 2.3 | 330 | 311 | 8.7 |
| Example 19 | 85:15:10 | 2.7 | 322 | 292 | 8.1 |
| Example 20 | 85:15:10 | 2.3 | 328 | 314 | 8.5 |

As shown in Table V the polyblends possess a unique and useful combination of improved impact strength, high heat distortion temperature, and high flexural moduli values.

Because of their unique combination of physical properties and excellent thermal properties, the polymer blends of this invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high impact strength is required. They can be used to prepare molded, calendered, or extruded articles and can be applied to a broad spectrum of uses in the form of sheets, rods, tapes, etc. The compositions may also be mixed with various modifying agents such as dyes, pigments, stabilizers, plasticizers, flame retardants, etc.

Obviously, other modifications and variations of the present invention are possible in light of the above disclosures. It is, therefore, to be understood that changes may be made in the particular embodiments of the invention described which are within the full intended scope of the invention as defined by the appended claims:

Having thus described our invention, what we claim and desire to protect by Letters Patent is:

1. A thermoplastic blend composition comprising:
   a. from 75 to 99 percent by weight of a thermoplastic polyphenylene oxide resin having the repeating unit:

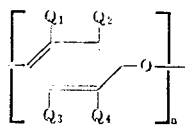

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, and halohydrocarbonoxy radicals having at least two carbon atoms between the halogen atom and phenol nucleus and being free of tertiary alpha-carbon atoms, and
   b. from 1 and 25 percent by weight of a poly(ethylene-co-organic-acid-ester) resin represented by the general formulas:

(I) 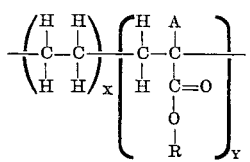

(II) 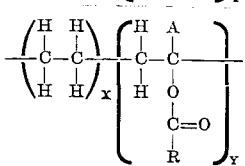

wherein X represents the number of ethylene units present in the copolymer; Y represents the number of organic-acid-ester units present in the copolymer; A is selected from the class consisting of hydrogen, methyl, ethyl, and halogen; and R is an alkyl, cycloalkyl, aralkyl, or aryl radical all of which may contain from one to 12 carbon atoms.

2. A resin blend of claim 1 wherein the polyphenylene oxide resin is a poly(2,6-dialkyl-1,4-phenylene) oxide resin.

3. A resin blend of claim 1 where the polyphenylene oxide resin is a poly(2,6-dimethyl-1,4-phenylene) oxide resin.

4. A resin blend of claim 1 where the poly(ethylene-co-organic-acid-ester) resin has an ethylene to organic-acid-ester ratio of from 95:5 to 60:40.

5. A resin blend of claim 4 where the poly(ethylene-co-organic-acid-ester) resin is an ethylene-ethyl acrylate copolymer.

6. A resin blend of claim 4 where the poly(ethylene-co-organic-acid-ester) resin is an ethylene-vinyl acetate copolymer.

7. A resin blend of claim 2 where the poly(ethylene-co-organic-acid-ester) resin has an ethylene to organic-acid-ester ratio of from 95:5 to 60:40.

8. A resin blend of claim 7 where the poly(ethylene-co-organic-acid-ester) resin is an ethylene-ethyl acrylate copolymer.

9. A resin blend of claim 7 where the poly(ethylene-co-organic-acid-ester) is an ethylene-vinyl acetate copolymer.

10. A resin blend of claim 3 where the poly(ethylene-co-organic-acid-ester) resin has an ethylene to organic-acid-ester ratio of from 95:5 to 60:40.

11. A resin blend of claim 10 where the poly(ethylene-co-organic-acid-ester) is an ethylene-ethyl acrylate copolymer.

12. A resin blend of claim 10 where the poly(ethylene-co-organic-acid-ester) resin is an ethylene-vinyl acetate copolymer.

13. A thermoplastic blended composition comprising:
    a. between about 75 percent and 99 percent by weight of a thermoplastic resin matrix consisting of a polyphenylene oxide resin as defined in claim 1 and an alkenyl aromatic polymeric resin consisting essentially of
       i. from 25 to 100 percent by weight, polymer units derived from compounds having the formula:

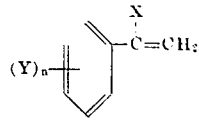

wherein X represents hydrogen or a lower alkyl radical; Y represents a member of the group consisting of hydrogen, halogens having atomic numbers of from 17 to 35 inclusive, and lower alkyl radicals containing from one to four carbon atoms; and $n$ represents an integer from 1 to 5, and
       ii. no more than 75 percent by weight, polymer units derived from compounds having the formula:

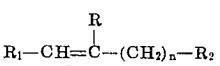

wherein R and $R_1$ each represents a substituent selected from the group consisting of hydrogen, halogen, an alkyl group having one to four carbon atoms, carboalkoxy, or R and $R_1$ compositely represent an anhydride linkage (—COOOC—), and $R_2$ is hydrogen, vinyl, and alkyl or alkenyl group having one to 12 carbon atoms, cycloalkyl, carboalkoxy, alkoxy alkyl, alkyl carboxy, ketoxy, halogen, carboxy, cyano, or pyridyl group and $n$ is an integer between 0 and 9, and
    b. from 0.1 to 25 percent by weight of an ethylene-organic-acid-ester copolymer represented by the general formulas:

(I) 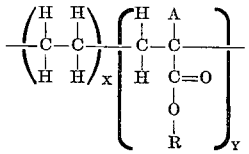

or (II) 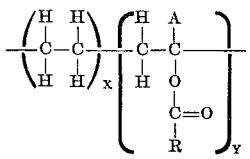

wherein X represents the number of ethylene units present in the copolymer; Y represents the number of organic-acid-ester units present in the copolymer; A is chosen from the class consisting of hydrogen, methyl, ethyl, and halogen; and R is an alkyl, cycloalkyl, aralkyl, or aryl radical all of which may contain from one to 12 carbon atoms.

14. A resin blend of claim 13 wherein the polyphenylene oxide comprises at least 50 percent of thermoplastic resin matrix.

15. A resin blend of claim 13 where the polyphenylene oxide resin is a poly(2,6-dialkyl-1,4-phenylene) oxide resin.

16. A resin blend of claim 13 where the polyphenylene oxide resin is a poly(2,6-dimethyl-1,4-phenylene) oxide resin.

17. A resin blend of claim 16 where the alkenyl aromatic resin polymer is polystyrene.

18. A resin blend of claim 16 where the alkenyl aromatic resin polymer is poly-α-methyl styrene.

19. A resin blend of claim 16 where the alkenyl aromatic resin polymer is polychlorostyrene.

20. A resin blend of claim 16 where the alkenyl aromatic resin is a styrene-acrylonitrile copolymer.

21. A resin blend of claim 16 where the alkenyl aromatic resin is a styrene-acrylonitrile-α-methyl styrene terpolymer.

22. A resin blend of claim 16 where the alkenyl aromatic resin is a styrene-acrylontrile-butadiene terpolymer.

23. A resin blend of claim 16 where the alkenyl aromatic resin is a styrene-butadiene copolymer.

24. A resin blend of claim 16 where the alkenyl aromatic resin is a styrene-maleic anhydride copolymer.

25. A resin blend of claim 16 where the alkenyl aromatic resin is a styrene-butyl acrylate-acrylonitrile terpolymer.

26. A resin blend of claim 17 where the ethylene-organic-acid-ester copolymer has an ethylene to organic-acid-ester ratio of from 95:5 to 60:40.

27. A resin blend of claim 26 where the ethylene-organic-acid-ester copolymer is an ethylene-ethyl acrylate copolymer.

28. A resin blend of claim 26 where the ethylene-organic-acid-ester copolymer is an ethylene-vinyl acetate copolymer.

29. A resin blend of claim 18 where the ethylene-organic-acid-ester copolymer has an ethylene to organic-acid-ester ratio of from 95:5 to 60:40.

30. A resin blend of claim 29 where the ethylene-organic-acid-ester copolymer is an ethylene-ethyl acrylate copolymer.

31. A resin blend of claim 29 where the ethylene-organic-acid-ester copolymer is an ethylene-vinyl acetate copolymer.

32. A resin blend of claim 19 where the ethylene-organic-acid-ester copolymer has an ethylene to organic-acid-ester ratio of from 95:5 to 60:40.

33. A resin blend of claim 32 where the ethylene-organic-acid-ester copolymer is an ethylene-ethyl acrylate copolymer.

34. A resin blend of claim 32 where the ethylene-organic-acid-ester copolymer is an ethylene-vinyl acetate copolymer.

35. A resin blend of claim 20 where the ethylene-organic-acid-ester copolymer has an ethylene to organic-acid-ester ratio of from 95:5 to 60:40.

36. A resin blend of claim 35 where the ethylene-organic-acid-ester copolymer is an ethylene-ethyl acrylate copolymer.

37. A resin blend of claim 35 where the ethylene-organic-acid-ester copolymer is an ethylene-vinyl acetate copolymer.

38. A resin blend of claim 21 where the ethylene-organic-acid-ester copolymer has an ethylene to organic-acid-ester ratio of from 95:5 to 60:40.

39. A resin blend of claim 38 where the ethylene-organic-acid-ester copolymer is an ethylene-ethyl acrylate copolymer.

40. A resin blend of claim 38 where the ethylene-organic-acid-ester copolymer is an ethylene-vinyl acetate copolymer.

41. A resin blend of claim 22 where the ethylene-organic-acid-ester copolymer has an ethylene to organic-acid-ester ratio of from 95:5 to 60:40.

42. A resin blend of claim 41 where the ethylene-organic-acid-ester copolymer is an ethylene-ethyl acrylate copolymer.

43. A resin blend of claim 41 where the ethylene-organic-acid-ester copolymer is an ethylene-vinyl acetate copolymer.

44. A resin blend of claim 23 where the ethylene-organic-acid-ester copolymer has an ethylene to organic-acid-ester ratio of from 95:5 to 60:40.

45. A resin blend of claim 44 where the ethylene-organic-acid-ester copolymer is an ethylene-ethyl acrylate copolymer.

46. A resin blend of claim 44 where the ethylene-organic-acid-ester copolymer is an ethylene-vinyl acetate copolymer.

47. A resin blend of claim 24 where the ethylene-organic-acid-ester copolymer has an ethylene to organic-acid-ester ratio of from 95:5 to 60:40.

48. A resin blend of claim 47 where the ethylene-organic-acid-ester copolymer is an ethylene-ethyl acrylate copolymer.

49. A resin blend of claim 47 where the ethylene-organic-acid-ester copolymer is an ethylene-vinyl acetate copolymer.

50. A resin blend of claim 25 where the ethylene-organic-acid-ester copolymer has an ethylene to organic-acid-ester ratio from 95:5 to 60:40.

51. A resin blend of claim 50 where the ethylene-organic-acid-ester copolymer is an ethylene-ethyl acrylate copolymer.

52. A resin blend of claim 50 where the ethylene!-organic-acid-ester copolymer is an ethylene-vinyl acetate copolymer.

\* \* \* \* \*